US008467377B2

(12) United States Patent
Kottilingal

(10) Patent No.: US 8,467,377 B2
(45) Date of Patent: *Jun. 18, 2013

(54) INTERLEAVING VOIP/VIP TRANSMISSION IN MULTIPLE SESSIONS TO INCREASE QUALITY OF SERVICE IN MOBILE DEVICES HAVING MULTIPLE INTERFACES

(75) Inventor: Sudeep Ravi Kottilingal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1370 days.

This patent is subject to a terminal disclaimer.

(21) Appl. No.: 11/211,249

(22) Filed: Aug. 24, 2005

(65) Prior Publication Data

US 2007/0064684 A1 Mar. 22, 2007

(51) Int. Cl.
*H04L 12/66* (2006.01)
*H04J 3/00* (2006.01)

(52) U.S. Cl.
USPC .......................................... 370/352; 370/336

(58) Field of Classification Search
USPC ........................................................ 370/356
See application file for complete search history.

(56) References Cited

U.S. PATENT DOCUMENTS

| 6,850,503 | B2 | 2/2005 | Dorenbosch et al. | |
|---|---|---|---|---|
| 7,398,088 | B2 | 7/2008 | Belkin et al. | |
| 7,412,529 | B2 | 8/2008 | Ryu | |
| 2002/0167921 | A1 | 11/2002 | Vakil et al. | |
| 2004/0030791 | A1* | 2/2004 | Dorenbosch et al. | 709/230 |
| 2004/0072593 | A1* | 4/2004 | Robbins et al. | 455/560 |
| 2004/0207724 | A1 | 10/2004 | Crouch et al. | |
| 2004/0264410 | A1 | 12/2004 | Sagi et al. | |
| 2005/0021616 | A1* | 1/2005 | Rajahalme et al. | 709/204 |
| 2005/0070288 | A1* | 3/2005 | Belkin et al. | 455/439 |
| 2006/0193295 | A1* | 8/2006 | White et al. | 370/336 |
| 2007/0047516 | A1 | 3/2007 | Kottilingal | |
| 2010/0040050 | A1* | 2/2010 | Johnston | 370/352 |

FOREIGN PATENT DOCUMENTS

| EP | 1443784 A1 | 8/2004 |
|---|---|---|
| JP | 2000278423 A | 10/2000 |

(Continued)

OTHER PUBLICATIONS

"Real-time applications on the Internet" by S. Rudkin, A. Grace, and M. W. Whybray, BT Technology Journal vol. 15 No. 2 (Apr. 1997), 209-225.*

(Continued)

*Primary Examiner* — Asad Nawaz
*Assistant Examiner* — Nicholas A Jensen
(74) *Attorney, Agent, or Firm* — Kevin Cheatham

(57) ABSTRACT

A first mobile device has two air interfaces. The first mobile device uses its first interface to transmit VoIP/VIP packets to a second device in a first session. If a quality of service decreases, then the first device causes a second session to be set up where the second session uses the second air interface. Both the first and second air interfaces are then used to communicate packets of a single media stream from the first device to the second device. The packets are transmitted in the first and second sessions in interleaved fashion, where the ratio of packets communicated in one session versus the other per unit time is adjusted in accordance with a quality of service afforded by one session versus a quality of service afforded by the other session. The second device orders the data payloads of the packets, thereby reconstructing the single media stream.

25 Claims, 12 Drawing Sheets

MEDIA FLOW HANDOFF CONTROL PACKET

| | FOREIGN PATENT DOCUMENTS | |
|---|---|---|
| JP | 2003319461 | 11/2003 |
| JP | 2004015538 A | 1/2004 |
| JP | 2005064877 | 3/2005 |
| JP | 2005123993 | 5/2005 |
| JP | 2006501702 A | 1/2006 |
| JP | 2007507161 A | 3/2007 |
| WO | WO03105442 A2 | 12/2003 |
| WO | WO2004013998 A2 | 2/2004 |
| WO | WO2005006570 A2 | 1/2005 |
| WO | WO2006010614 | 2/2006 |

OTHER PUBLICATIONS

The Session Initiation Protocol (SIP) Replaces Header by Mahy et al., Sep. 2004, RFC 3891.*

Hersent et al. IP Telephony Packet-based multimedia communications System, pp. 122-1145, 151, 152, copyright 2000.

International Search Report and Written Opinion—PCT/US2006/033271, International Search Authority—European Patent Office—Dec. 2, 2007.

R. Mahy et al., The Session Internet Protocol (SIP) "Join" Header draft-ietf-sip-join-03.txt, Feb. 2004, IEFT, apges 1-12.

* cited by examiner

INVITE FOR FIRST SESSION

INVITE SIP:BOB@BILOXI.COM SIP/2.0
    VIA: SIP/2.0/UDP PC33.ATLANTA1.COM;BRANCH=Z9HG4BK776ASDHDS
    MAX-FORWARDS: 70
    TO: BOB <SIP:BOB@BILOXI.COM>
    FROM: ALICE <SIP:ALICE@ATLANTA1.COM>;TAG=1928301774
    CALL-ID: A84B4C76E66710@PC33.ALTANTA1.COM
    CSEQ: 314159 INVITE
    CONTACT: SIP:ALICE@PC33.ATLANTA1.COM.
    CONTENT-TYPE: APPLICATION/SDP
    CONTENT-LENGTH: 142

INVITE FOR FIRST SESSION

INITIALIZE FIRST SESSION

FIRST SESSION ACTIVE -
PARTY A MOVES AWAY FROM LAN ACCESS POINT

SPAWN SIP:BOB@BILOXI.COM SIP/2.0
  VIA: SIP/2.0/UDP PC33.ATLANTA2.COM;BRANCH=ADFS
  MAX-FORWARDS: 70
  TO: BOB <SIP:BOB@BILOXI.COM>
  FROM: ALICE <SIP:ALICE@ATLANTA2.COM>;TAG=876767776
  CALL-ID: D7878-0-A2@PC33.ALTANTA2.COM
  CSEQ: 314160 SPAWN
  CONTACT: SIP:ALICE@PC33.ATLANTA2.COM.
  CONTENT-TYPE: APPLICATION/SDP
  CONTENT-LENGTH: 142

MASTER VIA: PC33.ATLANTA1.COM;BRANCH=Z9HG4BK776ASDHDS
  MASTER TO: BOB <SIP:BOB@BILOXI.COM>
  MASTER FROM: ALICE <SIP:ALICE@ATLANTA1.COM>;TAG=1928301774
  MASTER CALL-ID: A84B4C76E66710@PC33.ATLANTA1.COM
  MASTER CSEQ: 314159 INVITE
  MASTER CONTACT: <SIP:ALICE@PC33.ATLANTA.COM>

} SO CALLEE CAN IDENTIFY WITH FIRST SESSION

SPAWN MESSAGE

FIG. 7

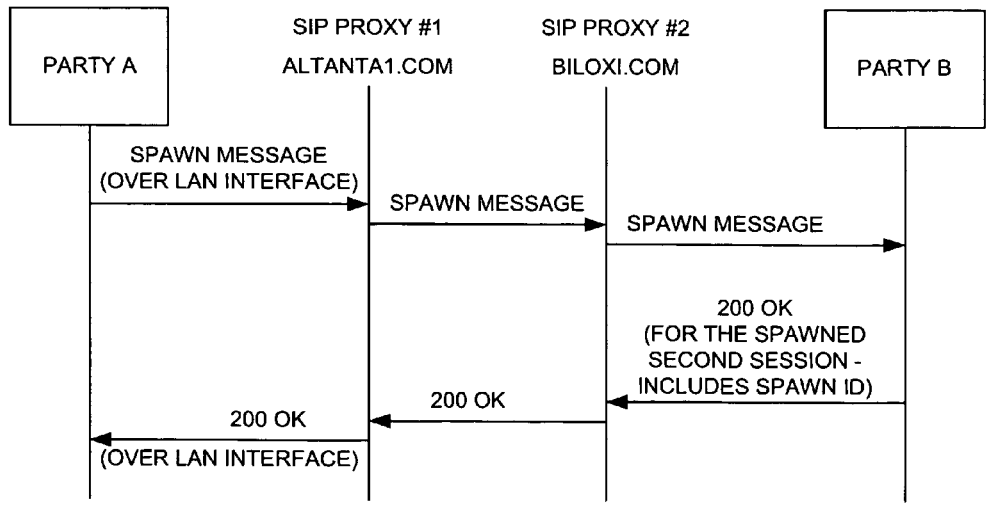

SPAWN MESSAGE

FIG. 8

SPAWN MESSAGE

INVITE FOR SECOND SESSION

BOTH FIRST SESSION AND SECOND SESSION
ARE ACTIVE

MEDIA FLOW HANDOFF

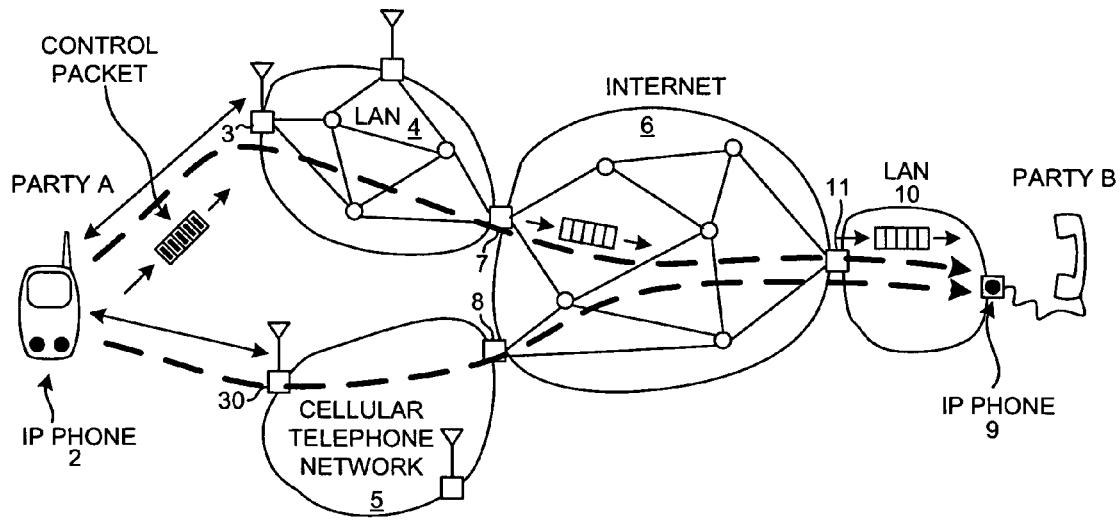

MEDIA FLOW HANDOFF CONTROL PACKET

FIG. 13

SWITCH SIP:BOB@BILOXI.COM SIP/2.0
    VIA: SIP/2.0/UDP PC33.ATLANTA2.COM;BRANCH=ADFDSGFSS
    MAX-FORWARDS: 70
    TO: BOB <SIP:BOB@BILOXI.COM>
    FROM: ALICE <SIP:ALICE@ATLANTA2.COM>;TAG=876198
    CALL-ID: D7878-0-A2@PC33.ALTANTA2.COM
    CSEQ: 31401 SWITCH
    CONTACT: SIP:ALICE@PC33.ATLANTA2.COM.
    CONTENT-TYPE: APPLICATION/SDP
    CONTENT-LENGTH: 142

SPAWN-ID: ASD14KLJLDK1567E409870

SWITCH-FROM: ALICE <SIP:ALICE@ATLANTA1.COM>
    SPAWN-TO: ALICE <SIP:ALICE@ATLANTA2.COM>

MEDIA FLOW HANDOFF CONTROL PACKET

FIG. 14

MEDIA FLOW OVER SECOND SESSION

BYE PACKET SENT ON FIRST SESSION

FIRST SESSION TERMINATED BUT
SECOND SESSION REMAINS

ALTERNATIVE HANDOFF MECHANISM

INTERLEAVED RTP TRANSMISSIONS FOR INCREASED BANDWIDTH

INTERLEAVING VOIP/VIP TRANSMISSION IN MULTIPLE SESSIONS TO INCREASE QUALITY OF SERVICE IN MOBILE DEVICES HAVING MULTIPLE INTERFACES

CROSS-REFERENCE TO OTHER APPLICATIONS

This application is related to U.S. patent application Ser. No. 11/211,237 entitled, "WIRELESS VoIP/VIP ROAMING TO ACCESS POINT OF DIFFERENT NETWORK TYPE", filed on Aug. 24, 2005.

BACKGROUND

1. Field

The disclosed embodiments relate generally to IP telephony.

2. Background

Mobile communication devices such as cellular telephones may have more than one air interface. In one example, a cellular telephone is able to communicate conventionally over relatively long distances with a cellular telephone network using a CDMA (Code Division Multiple Access) transceiver. The CDMA transceiver of the cellular telephone communicates with a cellular BTS (Base Transmitter Site) on the cellular telephone network. In addition, the cellular telephone is able to communicate over relatively short distances with a wireless local area network (LAN) using an IEEE 802.11 transceiver. The IEEE 802.11 transceiver of the cellular telephone communicates wirelessly with an access point on the LAN.

A first party may use the cellular telephone to place call to a second party using VoIP (voice over Internet Protocol) technology. Voice data is communicated in IP packets from the cellular telephone, over the 802.11 wireless link to the access point, through the LAN, and across the Internet to the second party. When the first party is engaged in such a call, the first party may move the mobile communication device with two air interfaces and end up with two active interfaces with less than perfect coverage. The conventional approach is to start using the interface with better coverage and start sending Real Time Traffic like RTP using the better interface. Because the mobile communication device does not have perfect coverage on the interface switched to, the quality of service may be affected. The chosen interface is then used to sent RTP data until coverage on that interface is completely lost or until coverage on the other interface improves. A solution is desired.

SUMMARY INFORMATION

A mobile communication device (for example, a cellular telephone) has one air interface for wireless communication with a wireless LAN (Local Area Network) and another air interface for cellular telephone communication with a cellular telephone network. Wireless communication with the wireless LAN may, for example, be in accordance with IEEE 802.11. The cellular telephone network may, for example, be a CDMA (Code Division Multiple Access) telephone network.

In accordance with a first novel aspect, the mobile communication device is initially used to transmit data payload VoIP packets of a media stream to a target communication device (for example, to another IP telephone that is coupled to the Internet at a remote location) in a first session across one of the air interfaces. The VoIP packets are communicated using RTP (Real-Time Protocol) over UDP (User Datagram Protocol) over (IP Internet Protocol). The VoIP media stream may, for example, involve voice data for a conversation between a first PARTY A using the mobile communication device and a second PARTY B using the target communication device.

It is then desired to continue the call using the other air interface of the mobile communication device. This may, for example, be due to the air interface initially being used being a short range wireless LAN interface. PARTY A may move out of the coverage area of the short range wireless LAN. It is desired to continue the call by switching to using the longer range cellular telephone air interface. Alternatively, it may be desired to switch from using the first air interface to the second air interface where the first interface is a longer range cellular telephone interface and the second air interface is a shorter range wireless LAN interface. Initially the cellular telephone air interface is used, but then PARTY A moves into the coverage area of the wireless LAN. If, for example, PARTY A's cellular telephone provider charges to carry a voice conversation on its cellular telephone network, then it may be desirable for PARTY A to stop using the cellular air interface and to continue the call using the less expensive wireless LAN air interface.

Regardless of the reason for desiring to switch from the initially used air interface to the other air interface, PARTY A's mobile communication device sends a SPAWN SIP message to PARTY B's target communication device. The SPAWN SIP message is communicated using SIP (Session Initialization Protocol) over TCP (Transmission Control Protocol) over IP. The target responds by sending a 200 OK SIP message that contains a spawn identifier. The mobile communication device then sets up a second session across the other air interface by sending a SIP INVITE request across the other interface to the target. The SIP INVITE request contains the spawn identifier. The second session is initialized and both the first and second sessions are active VoIP sessions. Neither session involves a circuit-switched link. The target communication device uses the spawn identifier received in the SIP INVITE request to associate the first and second sessions.

Once the second session is initialized, the mobile communication device stops transmitting VoIP packets for the media stream in the first session and transmits subsequent VoIP packets for the media stream in the second session. In some embodiments, a handoff control packet is sent from the mobile communication device to the target to alert the target that subsequent VoIP packets will no longer be received in the first session but rather will be received in the second session. In other embodiments, the target determines that the second session is now being used to communicate data payload VoIP packets because data payload VoIP packets for the media stream are no longer being received by the target in the first session but rather data payload VoIP packets for the media stream are now being received by the target in the second session. Regardless of how the target determines that VoIP packets are now being communicated in the second session, the flow of VoIP packets in both directions between PARTY A's communication device and PARTY B's communication device now occurs in the second session and not the first session.

Where, for example, the data payload VoIP packets contain voice data for a conversation, the communication device that receives the VoIP packets buffers VoIP payloads received in the second session in a FIFO (first in first out) buffer behind the payloads of the VoIP packets received in the first session. The VoIP packets are ordered in the FIFO according to the RTP sequence number and timestamps. The output of the FIFO buffer is converted into sound that is heard by the user of the communication device.

As long as the two sessions remain active, the flow of data payload VoIP packets can be switched from one session to the other and back as desired. A session not being used to communication data payload VoIP packets can be terminated if desired. To terminate the first session, the mobile communication device sends a SIP BYE message to the target communication device in accordance with the SIP protocol.

In accordance with a second novel aspect, a mobile communication device has both a first air interface and a second air interface. The first air interface may, for example, be an IEEE 802.11 interface for wireless RF communication with a wireless access point on a local area network (LAN). The second air interface may, for example, be a CDMA cellular telephone interface for wireless RF communication with an access point on a cellular telephone network.

In a VoIP/VIP call, the mobile communication device uses its first air interface to communicate VoIP/VIP packets in a first session from the mobile communication device to a second IP device. Software in the mobile communication device makes periodic assessments on a quality of service afforded by the first session. If the assessments indicate that the quality of service has decreased to an undesirable or unacceptable level, and if it is possible to use the second air interface, then the mobile communication device causes a second session to be set up between the mobile communication device and the second IP device, where the second session involves communication using the second air interface of the mobile communication device.

Rather than terminating the first session once the second session is set up, both the first and second sessions are used to communicate VoIP/VIP packets of a single media stream from the mobile communication device to the second IP device. In one example, the single media stream is voice data representing the voice of person using the mobile communication device. The VoIP/VIP packets are transmitted to the second IP device in the first session and second session in interleaved fashion. The second IP device receives the VoIP/VIP packets from the first and second sessions, and uses RTP timestamps and/or RTP sequence numbers to order the data payloads of the VoIP/VIP packets, thereby reconstructing the single media stream. The mobile communication device makes periodic assessments of a quality of service afforded by the first session and a quality of service afforded by the second session. In one embodiment, the ratio of VoIP/VIP packets transmitted form the mobile communication device in the first session versus the second session is the ratio of the assessment of quality of service of the first session versus the assessment of quality of service of the second session. One example of an assessment of quality of service of a session is a number of packets received in the session by the second IP device per unit time. The ratio of VoIP/VIP packets transmitted by the mobile communication device in the first session versus the second session is periodically adjusted to reflect changing assessments of quality of service in the two sessions. The ratio is not necessarily a calculated value, but rather is the inherent result of how many VoIP/VIP packets are transmitted in one session versus the other in a given time period. An assessment of quality of service of a session may include information in RTCP reports, detected signal strength information received from an access point, and/or instantaneous bit rate information received from an access point.

In the same way that the ratio of VoIP/VIP packets transmitted from the mobile communication device is adjusted, so too is the ratio of VoIP/VIP packets transmitted to the mobile communication device in the first session versus second session adjusted. The ratio of packets transmitted from the mobile communication device need not be the same as the ratio of packets transmitted to the mobile communication device. The mechanisms used to make assessments of quality of service in the mobile communication device and in the second IP device need not be identical.

Additional embodiments are described in the detailed description below. This summary does not purport to define the invention. The invention is defined by the claims.

BRIEF DESCRIPTION OF THE DRAWINGS

FIG. 7 is a diagram of a SPAWN SIP message sent from IP phone 2 to IP phone 9 in accordance with the method of the first novel aspect.

FIG. 8 is a diagram that illustrates the communication of the SPAWN SIP message in the method of the first novel aspect.

FIG. 9 also illustrates the returning 200 OK SIP message that includes a SPAWN ID.

FIG. 13 illustrates the sending of the handoff control packet from IP phone 2 to IP phone 9.

FIG. 14 is a diagram of the handoff control packet.

DETAILED DESCRIPTION

Figure 1:
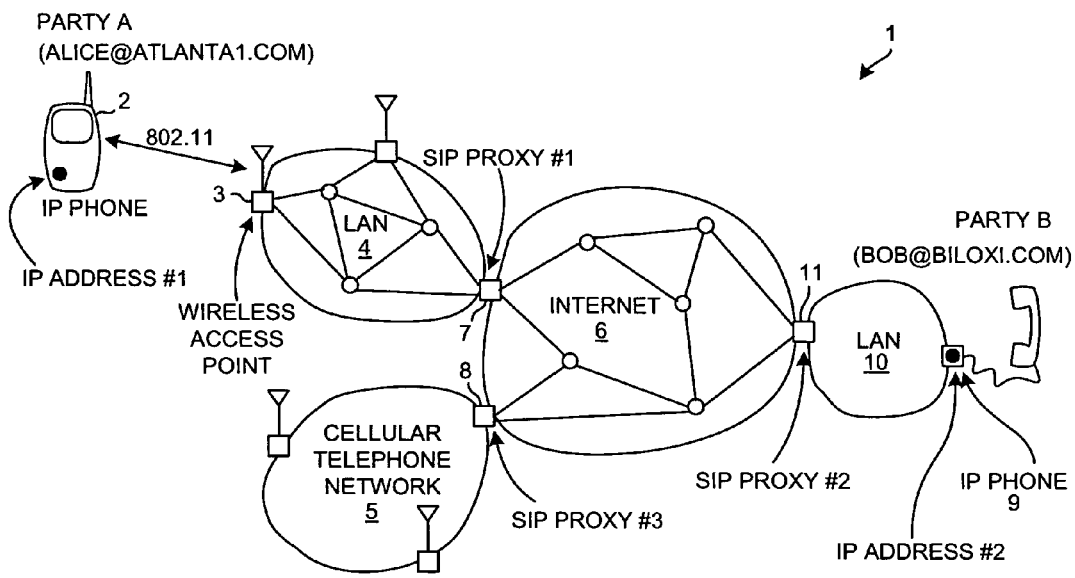
FIG. 1 is a simplified topological diagram of an IP (Internet Protocol) telephony communication system 1 in accordance with a first novel aspect.

FIG. 1 is a simplified topological diagram of an IP (Internet Protocol) telephony communication system 1 in accordance with a first novel aspect. A first party (denoted "PARTY A" in FIG. 1) uses a mobile wireless communication device such as an IP phone 2. IP phone 2 has an IP address denoted IP address #1 in FIG. 1. EP phone 2 is capable of short range wireless communication with an access point 3 on a LAN (Local Area Network) 4 provided that IP phone 2 is within communication range of access point 3. EP phone 2 and access point 3 communicate in this example in accordance with the IEEE 802.11 specification. LAN 4 includes multiple such access points so that PARTY A can move the IP phone 2 around in a local region and remain in communication with LAN 4 via at least one of the access points.

System 1 also includes a cellular telephone network 5. Cellular telephone network 5 in this example is a CDMA (Code Division Multiple Access) cellular telephone network. IP phone 2 is also capable of long range wireless communication with a transceiver on CDMA cellular telephone network 5. Party A can use IP phone 2 to place and receive calls via CDMA cellular telephone network 5. Because IP phone 2 is capable of 802.11 communication as well as CDMA cellular telephone communication, IP phone 2 is termed a dual-mode IP phone.

LAN 4 and cellular telephone network 5 are coupled to an IP network. The IP network in this example is an internet or the "Internet" 6. Internet 6 includes a plurality of interconnected routers. A SIP proxy 7 is disposed both on LAN 4 and on the Internet 6 such that this SIP proxy 7 can communicate IP packets from LAN 4 and to Internet 6 and from Internet 6 and to LAN 4. SIP proxy 7 acts both as an inbound proxy and an outbound proxy for the ATLANTA1.com domain of LAN 4. SIP proxy 7 acts as a server on LAN 4 and as a client on Internet 6. SIP proxy 7 relays SIP requests and SIP responses from/to other SIP proxies and SIP session end points.

Another SIP proxy 8 is disposed both on cellular telephone network 5 and on Internet 6 such that this SIP proxy 8 can communicate IP packets from cellular telephone network 5 and to Internet 6 and from Internet 6 and to cellular telephone network 5. SIP proxy 8 acts both as an inbound proxy and an outbound proxy for the ATLANTA2.com domain of cellular telephone network 5. SIP proxy 8 acts as a server on cellular telephone network 5 and as a client on Internet 6. SIP proxy 8 relays SIP requests and SIP responses from/to other SIP proxies and SIP session end points.

A second party (denoted "PARTY B" in FIG. 1) has a second communication device such as an IP phone 9. IP phone 9 in this example is not a mobile IP telephone, but rather is a stationary landline IP telephone. IP phone 9 has an IP address denoted IP address #2 in FIG. 1. IP phone 9 is coupled to the Internet 6 via a LAN 10. LAN 10 may, for example, be a LAN maintained by PARTY B's Internet Service Provider (ISP) or may be a corporate LAN maintained by PARTY B's employer. A SIP proxy 11 is disposed both on LAN 10 and on the Internet 6 such that this SIP proxy 11 can communicate IP packets from LAN 10 and to Internet 6 and from Internet 6 and to LAN 10. SIP proxy 11 acts both as an inbound proxy and an outbound proxy for the BILOXI.com domain of LAN 10. SIP proxy 11 acts as a server on LAN 10 and as a client on Internet 6. SIP proxy 11 relays SIP requests and SIP responses from/to other SIP proxies and SIP session end points.

Figure 2:
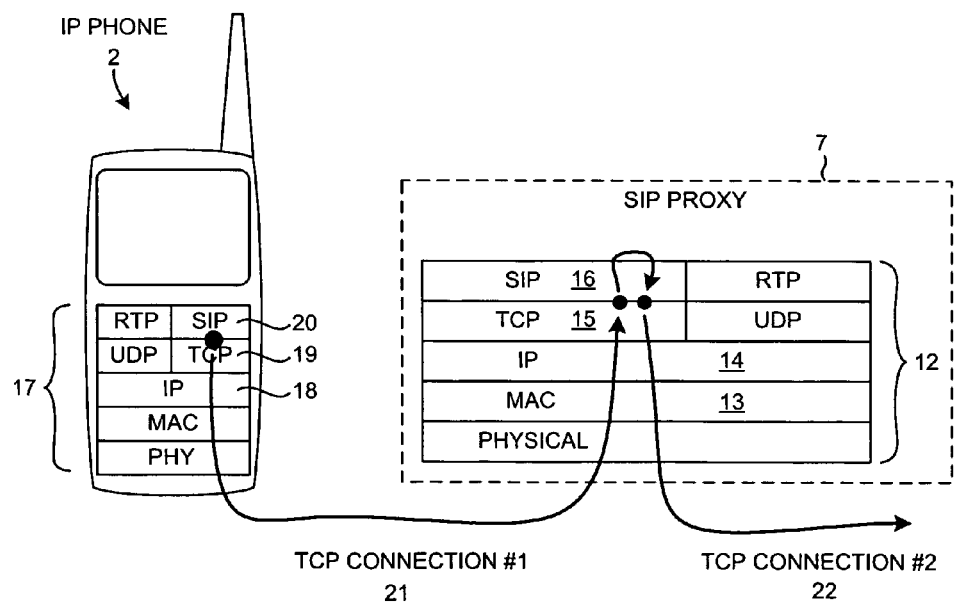
FIG. 2 illustrates a TCP connection between IP phone 2 and SIP proxy 7 in the system of FIG. 1.

FIG. 2 illustrates IP phone 2 and SIP proxy 7. A stack 12 of protocol processing layers executes on the hardware platform of SIP proxy 7. There is one such stack of protocol processing layers executing on each of the SIP proxies 7, 8 and 11. Stack 12 includes, among other layers, a MAC layer 13, an IP layer 14, a TCP layer 15, and a SIP layer 16. MAC stands for "Media Access Control". IP stands for "Internet Protocol". TCP stands for "Transmission Control Protocol". SIP stands for "Session Initialization Protocol". The processor within IP phone 2 executes a similar stack 17 of protocol processing layers. Stack 17 includes an IP layer 18, a TCP layer 19 and a SIP layer 20. Because each of the stacks 12 and 17 includes an IP layer and a TCP layer, a TCP connection can be established between the IP phone 2 and SIP proxy 7. In FIG. 2, the black dot in IP phone 2 represents IP address #1 of IP phone 2. The black dots in SIP proxy 7 represent IP addresses. The leftmost arrow represents a first TCP connection 21 that terminates in IP phone 2 and in SIP proxy 7. Whereas IP protocol communication is only a best-efforts communication, the use of TCP in addition to IP allows the reliable communication of information between IP phone 2 and SIP proxy 7 across the TCP connection 21. In the same way that TCP connection 21 is established and maintained between IP phone 2 and SIP proxy 7, a second TCP connection 22 is established and maintained between SIP proxy 7 and another device on the Internet that has an IP address and that has a stack involving IP and TCP protocol processing layers. SIP proxy 11 (see FIG. 1) is one such device. In FIG. 2, the rightmost arrow represents a second TCP connection 22 that is terminated on one end by SIP proxy 7 and on another end by SIP proxy 11.

Figures 3, 4:
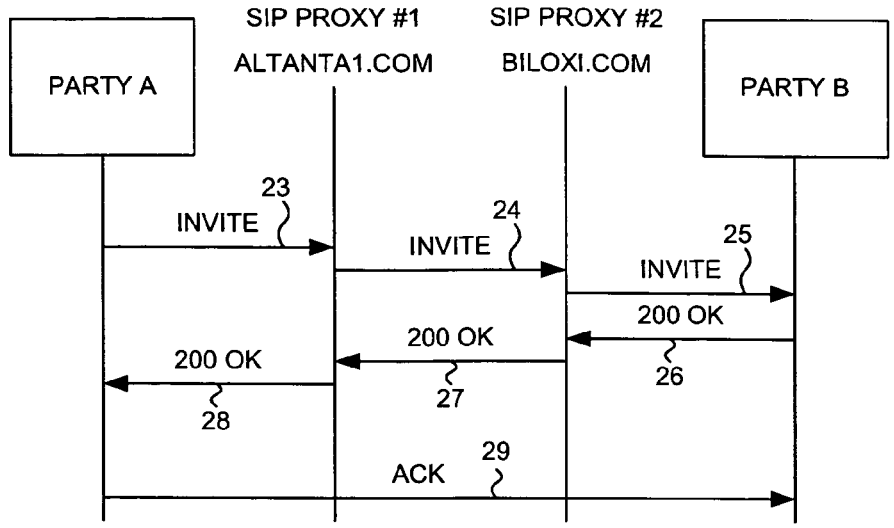
FIG. 3 is a diagram of a first step in accordance with a method of the first novel aspect.
FIG. 4 is a diagram of the SIP INVITE request for setting up a first session in accordance with the method of the first novel aspect.

FIG. 3 is a diagram of a first step in accordance with a method of the first novel aspect. In the diagram, time extends from top to bottom in the vertical dimension. The box labeled "PARTY A" and the vertical line extending downward from the box represents IP phone 2. The box labeled "PARTY B" and the vertical line extending downward from the box represents IP phone 9. The vertical line labeled "SIP PROXY #1" represents SIP proxy 7. The vertical line labeled "SIP PROXY #2" represents SIP proxy 11.

Within IP phone 2 is stored an identification of a SIP proxy to be used when IP phone 2 is in communication with LAN 4. IP phone 2 stores another identification of another SIP proxy to be used when IP phone 2 is in communication with cellular telephone network 5. In the present example, the identification of the SIP proxy to be used when communicating with LAN 4 is PROXY1.ATLANTA1.COM. The identification of the SIP proxy to be used when communicating with cellular telephone network 5 is PROXY3.ATLANTA2.COM. Because IP phone 2 is in communication with LAN 4, IP phone 2 uses the identification PROXY1.ATLANTA1.COM and resolves this identification to get the IP address of the LAN side of the identified SIP proxy. If the IP address of the LAN side of the identified SIP proxy is cached in IP phone 2 in association the SIP proxy having been addressed in a prior SIP transaction, then the cached IP address is used as the IP address of the LAN side of the SIP proxy. If the IP address of the LAN side of the identified SIP proxy is not cached in IP phone 2, then IP phone 2 sends a DNS request to a DNS server (not illustrated). The DNS server is, in this example, located on LAN 4. The DNS server contains a lookup table that contains, for each SIP proxy, an IP address. The DNS server responds to the DNS request by sending the IP address back to IP phone 2. In the present example, the IP address of IP phone 2 may be 10.32.1.141. Regardless of how IP phone 2 obtains the IP address of the LAN side of the identified SIP proxy, IP phone 2 acts as a SIP caller or call initiator and sends the SIP INVITE request to the IP address of the LAN side of the SIP proxy out over TCP connection 21 between IP phone 2 and SIP proxy 7. In FIG. 3, the uppermost arrow 23 extending from PARTY A to ATLANTA1.COM represents the sending of this SIP INVITE request.

FIG. 4 is a diagram of the SIP INVITE request. A header field portion of the SIP INVITE request indicates that the SIP INVITE request is directed to the SIP address BOB@BILOXI.COM. A header field portion of the SIP INVITE request indicates that the SIP INVITE is "FROM" SIP address ALICE@ATLANTA1.COM. The SIP INVITE request is received at the terminated TCP connection on SIP proxy 7 and is supplied up to the SIP protocol processing layer of SIP proxy 7. The SIP protocol processing layer of SIP proxy 7 examines the addressee information and obtains BOB@BILOXI.COM. The SIP protocol processing layer then uses a set of policies to determine where to send the SIP INVITE request. The set of policies indicates, for each domain name, an associated SIP proxy. In the present example, a policy indicates that domain name BILOXI.COM is to be served by associated SIP proxy #2. The SIP protocol processing layer within SIP proxy 7 then resolves the identified SIP proxy #2 to determine the Internet side IP address of SIP proxy #2. This may be done by consulting cached information or by performing a DNS server lookup. Once the Internet side IP address of SIP proxy #2 is determined, SIP proxy 7 establishes a TCP connection to SIP proxy #2 and forwards the SIP INVITE request across Internet 6 to SIP proxy #2 (see FIG. 1). SIP proxy #2 is on domain BILOXI.COM. BILOXI.COM is the domain name of LAN 10. In the diagram of FIG. 3, arrow 24 extending from ATLANTA1.COM to BILOXI.COM represents this forwarding of the SIP INVITE request from SIP proxy 7 to SIP proxy 11.

SIP proxy 11 receives the SIP INVITE request. The SIP layer of the stack executing on SIP proxy 11 knows the IP addresses of all devices on LAN 10. From the indicated SIP callee address BOB@BILOXI.COM of the SIP INVITE request, the SIP layer of SIP proxy 11 obtains the IP address of BOB@BILOXI.COM and forwards the SIP INVITE request to the IP address (IP address #2) of IP phone 9 across a TCP connection. In FIG. 3, arrow 25 extending from BILOXI.COM to PARTY B represents this forwarding. The SIP layer of the stack of IP phone 9 receives the SIP INVITE request and, in accordance with the SIP protocol, returns a 200 OK SIP message. The 200 OK SIP message is forwarded back to PARTY A and IP phone 2 through SIP proxy 11 and SIP proxy 7 in the reverse process of the forwarding process described above. In FIG. 3, this forwarding is represented by arrows 26, 27 and 28.

Next, IP phone 2 receives the 200 OK SIP message and therefrom obtains the IP address of IP phone 9. IP phone 2 can then establish a TCP connection directly from IP phone 2 to IP phone 9. In response to receiving the 200 OK SIP message, IP phone 2 sends a SIP acknowledge (ACK) message back to IP phone 9 across the TCP connection. In FIG. 3, this is illustrated by arrow 29 that extends directly from PARTY A to PARTY B.

Figure 5:
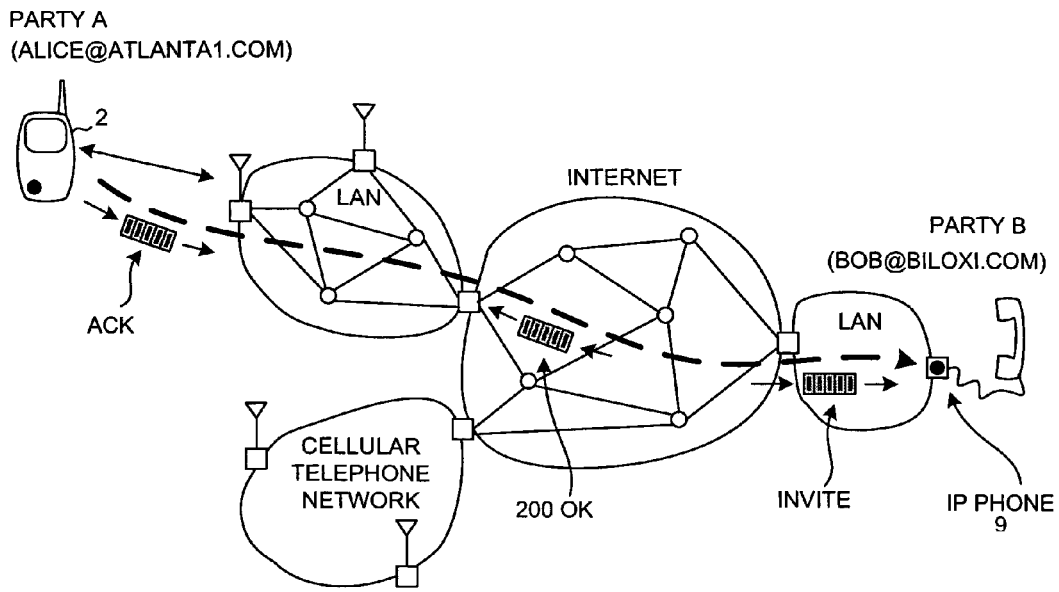
FIG. 5 illustrates the initialization of the first session.

FIG. 5 illustrates this SIP transaction involving the SIP INVITE request, the 200 OK message, and the ACK. Although all three SIP messages of the transaction are illustrated as propagating through the networks at the same time, the SIP messages are actually sent and received one at a time as described above. The result of the SIP transaction is the initialization of a first SIP session between IP address #1 (of PARTY A) and IP address #2 (of PARTY B). An initialized SIP session that has not been terminated is said to be "active", regardless of whether data payloads are being communicated in the session or not. In the present example, once the first SIP session has been initialized, first VoIP/VIP (voice over IP or video over IP) IP packets having voice and/or video data payloads are communicated between IP address #1 of IP phone 2 and IP address #2 of IP phone 9 in UDP (User Datagram Protocol) packets in accordance with the RTP (Real-Time Protocol) protocol. Data payloads for the first session are communicated using RTP over UDP over IP, whereas control packets for the first session are communicated using SIP over TCP over IP.

Figure 6:
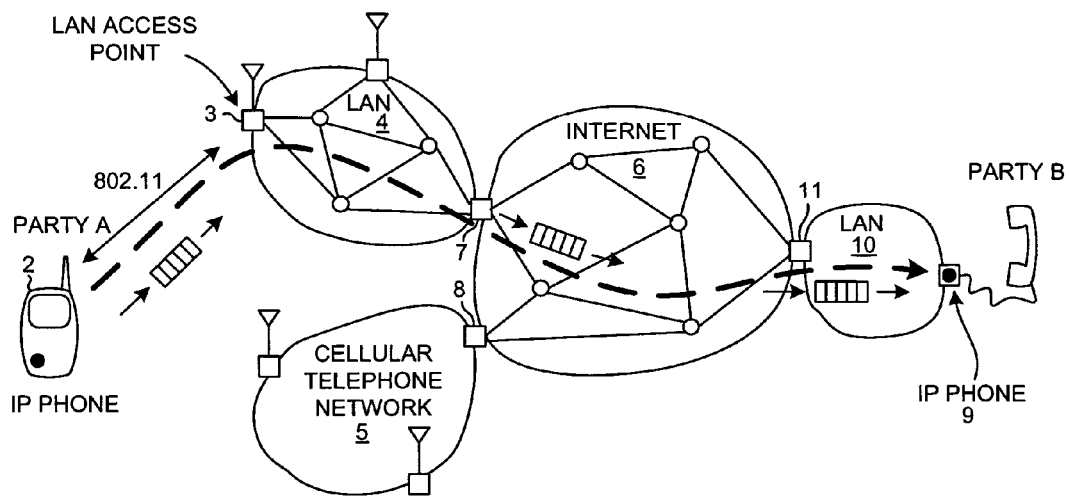
FIG. 6 illustrates the first session as PARTY A moves IP phone 2 away from the access point 3 of the system of FIG. 1.

FIG. 6 illustrates the communication of some of these first VoIP/VIP IP data payload packets between IP phone 2 and IP phone 9. This communication involves wireless communication in accordance with the 802.11 protocol between IP phone 2 and access point 3 of LAN 4. 802.11 is a relatively short range RF communication protocol. In the present example, PARTY A moves farther and farther away from access point 3. IP phone 2 detects the signal strength of RF transmissions received from access point 3. In the present example, an indication of the detected signal strength is available on the IP phone 2 as an RSSI (Radio Signal Strength Indicator) signal that is output from the receiver amplifier of the 802.11 transceiver in IP phone 2. The receiver amplifier of the 802.11 transceiver within access point 3 also detects the signal strength of RF transmissions received from IP phone 2 and this detected signal strength is reported from access point 3 back to IP phone 2. IP phone 2 is therefore cognizant of the strength of received transmissions in both directions. As PARTY A and IP phone 2 move away from access point 3, the detected signal strength of the 802.11 wireless link between IP phone 2 and access point 3 degrades until a threshold is reached. Once the threshold is reached, IP phone 2 determines that IP phone 2 should initialize a second SIP session using its long range cellular telephone transceiver. IP phone 2 initializes the second SIP session by sending a novel SIP message called a SPAWN message from PARTY A to PARTY B in the first session.

FIG. 7 is a diagram that illustrates the SPAWN SIP message.

FIG. 8 is a diagram that illustrates the communication of this SPAWN SIP message from PARTY A to PARTY B. In the same manner as the INVITE SIP message is communicated from PARTY A to PARTY B as described above, so too is the SPAWN SIP message communicated from IP phone 2, across the 802.11 wireless link to access point 3 on LAN 4, across LAN 4 to SIP proxy 7, across Internet 6 and to SIP proxy 11, and across LAN 11 and to PARTY B's IP phone 9. PARTY B's IP phone 9 receives the SPAWN SIP message and responds by sending a 200 OK SIP message back to PARTY A's IP phone 2. This 200 OK SIP message, however, includes a SPAWN ID (spawn identifier). IP phone 9 generates the SPAWN ID by generating a hash of the FROM field, the TO field, the CALL-ID field and the CSEQ number of the first session. The SPAWN-ID is stored in IP phone 9 for future reference to associate a second session with the first session. In the present example, the SPAWN ID is a sixteen-byte character string that follows a field name "SPAWN-ID:" in the 200 OK SIP message. The 200 OK SIP message that includes the SPAWN ID is forwarded back to IP phone 2 through SIP proxy 11 and SIP proxy 7.

Figure 9:
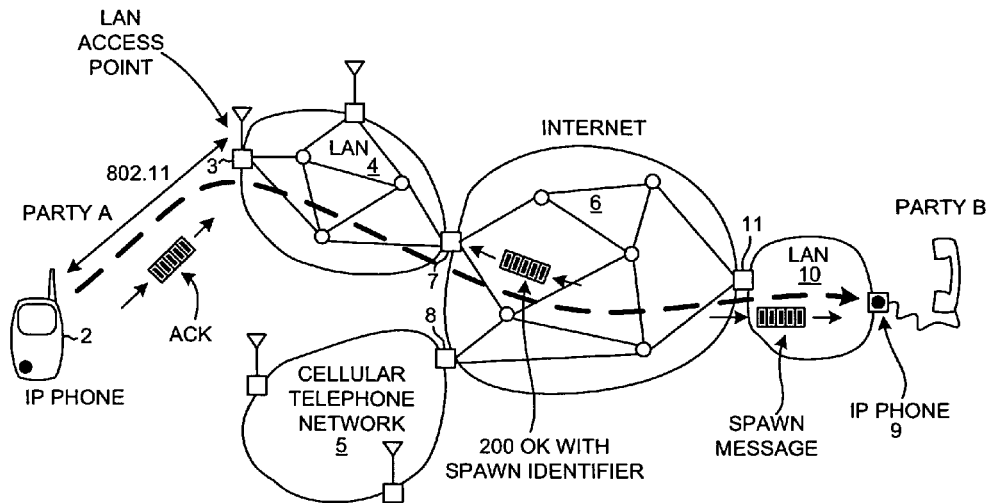
FIG. 9 illustrates the communication of the SPAWN SIP message through the system of FIG. 1.

FIG. 9 is a diagram that illustrates this SIP transaction involving the SPAWN SIP request, the 200 OK that includes the SPAWN ID, and the ACK. As illustrated, this transaction occurs in the first SIP session.

Figure 10:
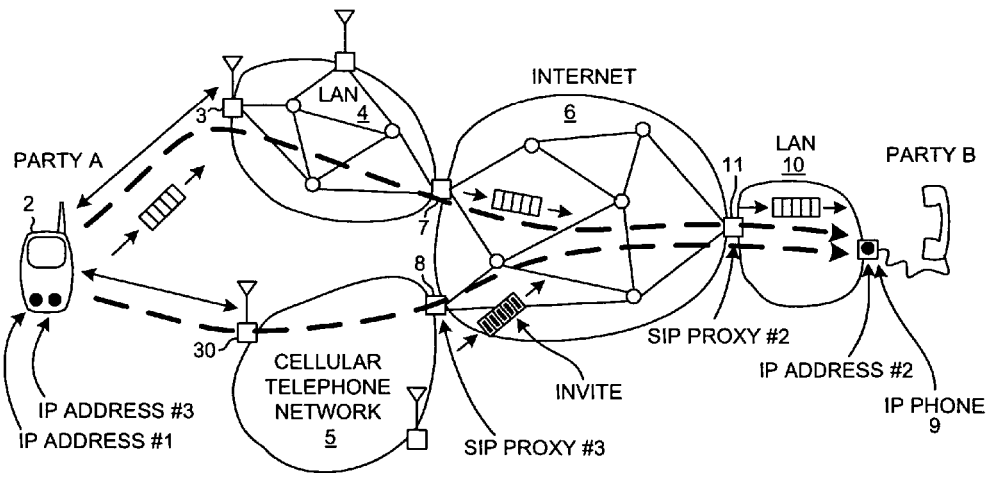
FIG. 10 illustrates the sending of a second SIP INVITE request from IP phone 2 to IP phone 9 to initialize a second session in accordance with the method of the first novel aspect.

FIG. 10 is a diagram that illustrates a next step wherein IP phone 2, upon receiving the 200 OK, issues a second INVITE SIP request. The black dots in IP phone 2 represent IP addresses. The second INVITE request includes the SPAWN ID and is communicated from PARTY A's IP phone 2 to PARTY B's IP phone 9. This second INVITE request is communicated across CDMA cellular telephone link from IP phone 2 to an access point (called a BTS or Base Transmitter Site) 30 on cellular telephone network 5 and then across cellular telephone network 5 to SIP proxy #3 (SIP proxy 8). This communication is across a TCP connection terminated at one end at an IP address #3 on IP phone 2 and at another end to the cellular telephone network side IP address of SIP Proxy 8. The second INVITE request is then forwarded on from SIP proxy 8 across Internet 6 to SIP proxy 11 across another TCP connection. The second INVITE request is then forwarded from SIP proxy 11 across LAN 10 to PARTY B's IP phone 9 across another TCP connection.

Whereas PARTY B's IP phone 9 would ordinarily reject an incoming INVITE request due to there already being an existing active session (the first session), in the presently described method SIP layer functionality within PARTY B's IP phone 9 recognizes the SPAWN ID of the incoming second INVITE request, sets up a second session including opening its own RTP streams, and associates the second session with the first session. IP phone 9 recognizes the SPAWN ID of the incoming second INVITE request by comparing the SPAWN-ID to its list of stored SPAWN-IDs.

Figure 10A:
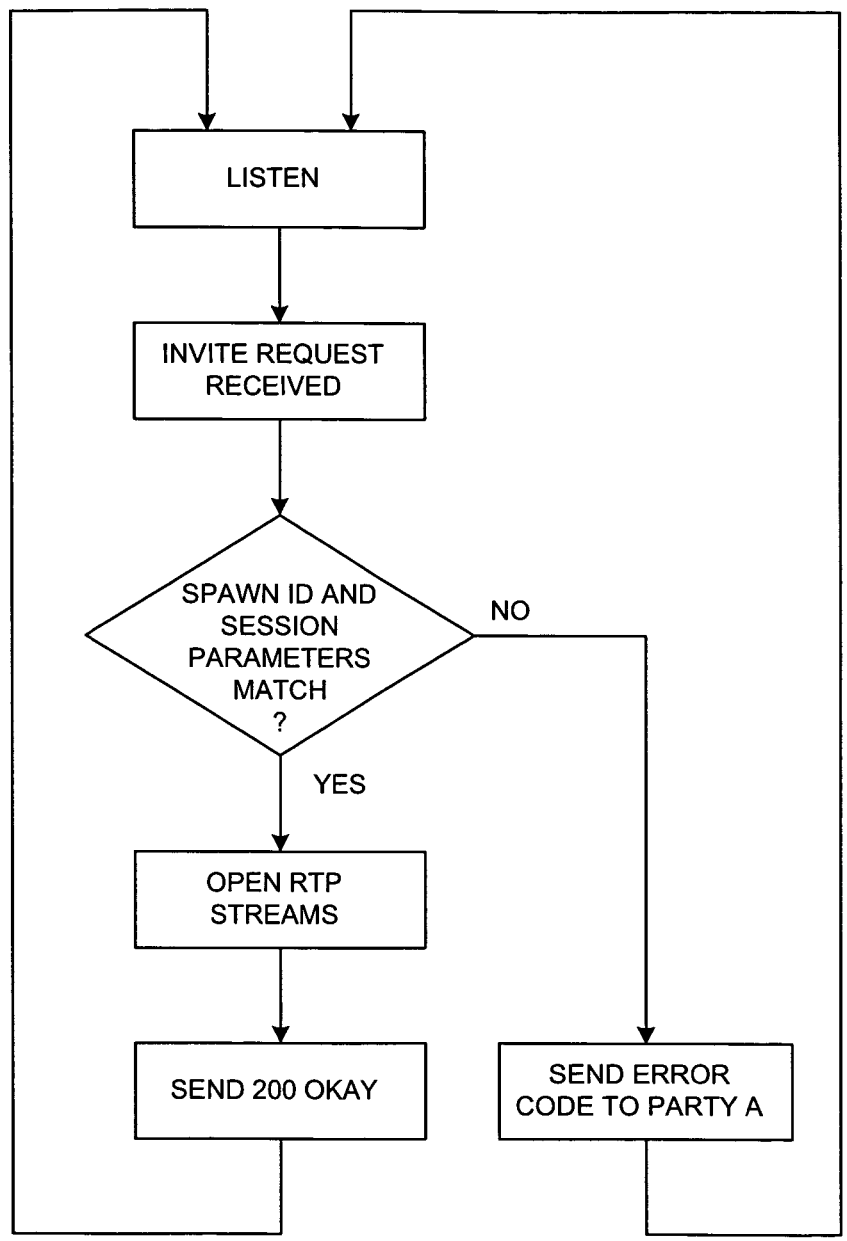
FIG. 10A is a simplified diagram of the structure of the software executing in IP phone 9.

FIG. 10A is a simplified diagram of the structure of the software executing in IP phone 9. IP phone 9 responds by returning a 200 OK SIP message back to PARTY A's IP phone 2. IP phone 2 completes the transaction by sending an ACK back to IP phone 9. The second INVITE request, the 200 OK, and the ACK are communicated from and to IP phone 2 through a CDMA wireless link and CDMA BTS 30.

Figure 11:
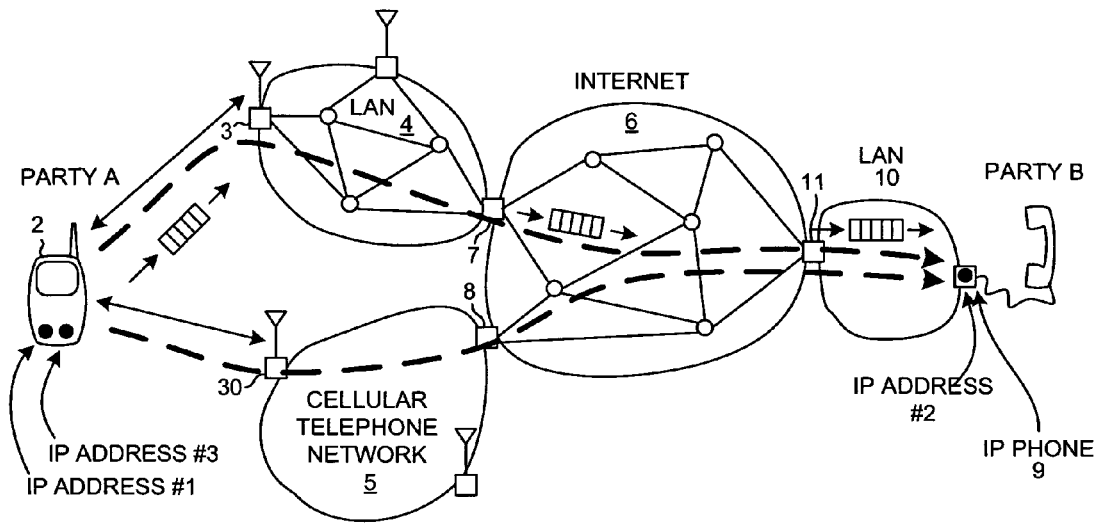
FIG. 11 illustrates both the first and second sessions being active.

FIG. 11 is a diagram that illustrates the active first session and the now initialized and active second session. Although the second session is active, data payload packets are not yet being communicated in the second session using RTP over UDP over IP. The first session (that involves 802.11 communication between IP phone 2 and access point 3) has a first CALL-ID whereas the second session now being initialized (that involves CDMA communication between IP phone 2 and cellular BTS 30) has a second CALL-ID.

Figure 12:
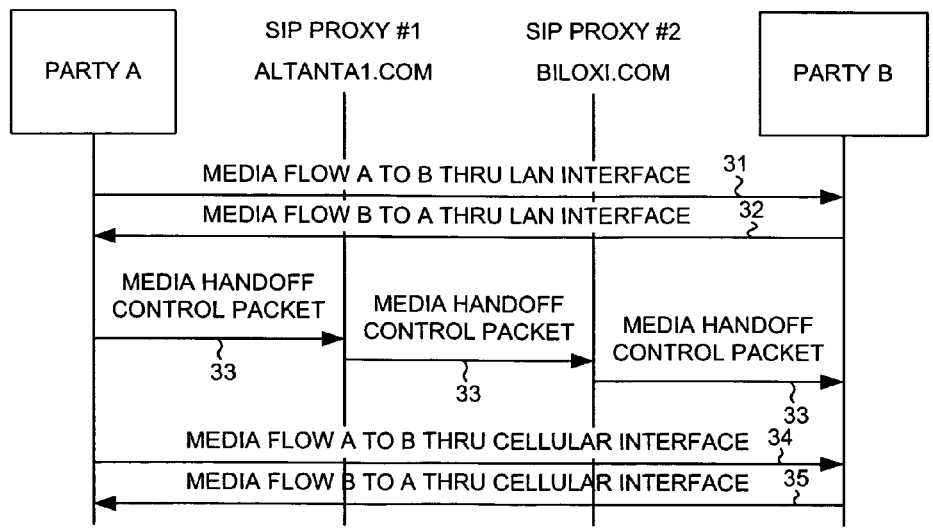
FIG. 12 is a diagram that illustrates the use of a media handoff control packet to signal to switching of VoIP data packets from the first session to the second session.

FIG. 12 illustrates a subsequent step wherein payload data media flow between IP phone 2 and IP phone 9 is switched (or "handed off") from the first session to the second session. Arrows 31 and 32 illustrate the initial flow of payload data media flow VoIP packets between PARTY A's IP phone 2 and PARTY B's IP phone 9. A data control handoff packet is then sent from PARTY A's IP phone 2 to PARTY B's IP phone 9 using RTP over UDP over IP. In the present example, this data control handoff packet is communicated in the first session through SIP proxies 7 and 11, but the data control handoff packet can also be communicated in the second session through SIP proxies 8 and 11. Arrows 33 illustrate the forwarding of the data control handoff packet. The data control handoff packet is a SIP message that, in one example, includes a SWITCH-FROM: field name and a SWITCH-TO: field name. The data control handoff packet is used to communicate to IP phone 9 that subsequent data payload packets will be sent in the second session. To cope with possible loss of the data control handoff packet, it is mandated that PARTY B not reject control packets which were originated by PARTY A's IP phone 2 using IP address #3.

FIG. 13 illustrates the media flow handoff control packet 34 following data payload packets that are being communicated in the first session from IP phone 2 to IP phone 9.

FIG. 14 is a diagram of the media flow handoff control packet 34. After sending the media flow handoff control packet, IP phone 2 switches from sending data payloads of the media stream in the first session to sending data payloads of the media stream in the second session. The media stream in the present example is a voice conversation. When IP phone 9 receives the media flow handoff control packet, IP phone 9 receives subsequent data payload packets on the second session and buffers the data payloads of those packets in a FIFO (first-in-first out) memory behind previously received data payloads of packets received on the first session. The data payloads are output from the FIFO and supplied to the user of IP phone 9 so that the data payloads are ordered according to RTP sequence number and timestamps. Data payloads of the media stream are therefore seamlessly switched from the first active session to the second active session without the call being perceptively broken. Neither the first session nor the second session involves any circuit-switched portions. Both the first session and the session involve VoIP packets and IP phone 9 retains knowledge of the two sessions. The two sessions do not constitute a three-way call. Moreover, SIP proxies 7, 8 and 11 are standard SIP proxies that do not involve any special functionality to support the novel SPAWN method. In FIG. 12, arrows 34 and 35 illustrate the flow of subsequent VoIP data payload packets in the second session.

Figure 15:
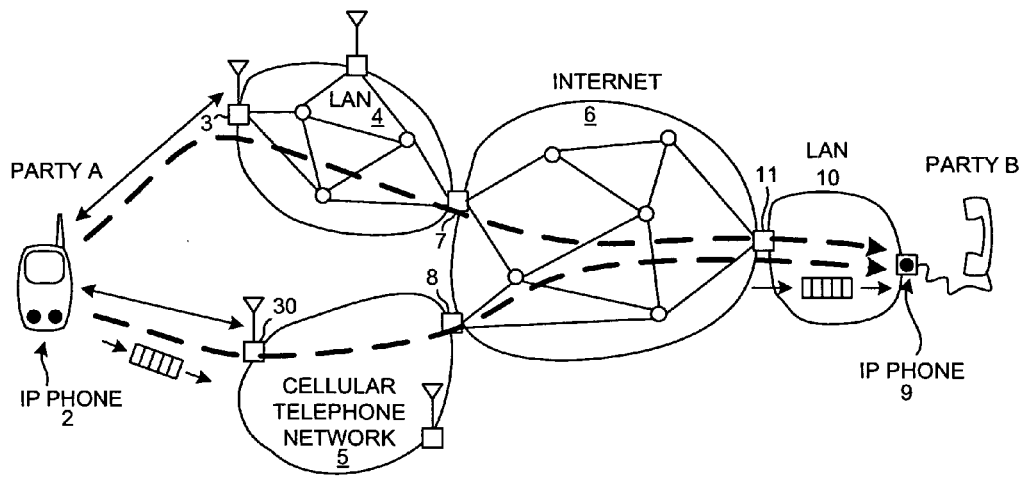
FIG. 15 illustrates the flow of data payloads over the second session.

FIG. 15 illustrates the flow of data payload VoIP packets in the second session after the data control handoff packet was communicated in the first session. IP phone 2 can switch the flow data payload VoIP packets back and forth between the first session and the second session as required or desired.

Figure 16:
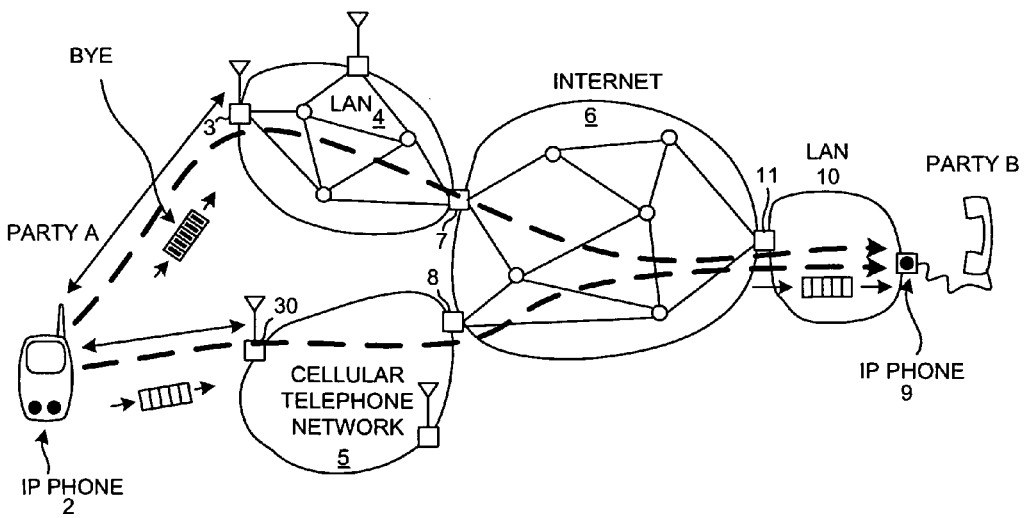
FIG. 16 illustrates the sending of a BYE SIP message from IP phone 2 to IP phone 9 to terminate the first session.

FIG. 16 illustrates a subsequent step wherein IP phone 2 terminates the first session by sending a SIP BYE message to IP phone 9. Where the signal strength of the 802.11 wireless link is decreasing, this BYE message is sent while there is still communication between IP phone 2 and access point 3. After the BYE message is sent and received, the first session is terminated and the second session is used to sustain communication of data payload packets for the media stream.

Figure 17:
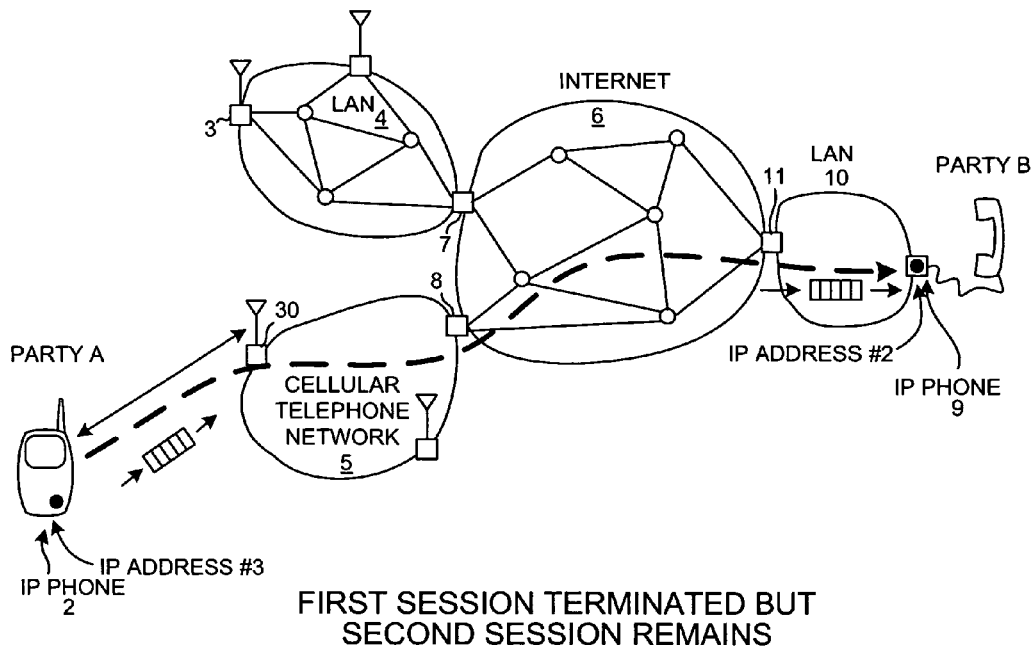
FIG. 17 illustrates the system of FIG. 1 after the first session has been terminated. Data payload VoIP packets for the media stream are no longer being communicated in the first session but rather are now being communicated in the second session.

FIG. 17 illustrates the flow of data payload VoIP packets in the second session after the first session has been terminated.

Although the example described above involves switching from a first session that has an 802.11 link to a second session that has a CDMA link, this need not be the case. In another example, the first session involves a CDMA wireless link and the second session involves an 802.11 wireless link. Such a situation might present itself when PARTY A is initially using CDMA communication through cellular BTS 30 and then arrives into the local coverage area of access point 3. Although both CDMA and 802.11 service are available within the local coverage area of access point 3, the method described above is used to setup a second session that involves the 802.11 wireless link. The flow of data payload VoIP packets is then switched from the CDMA first session to the 802.11 second session. To avoid charges associated with use of the CDMA link, the first session having the CDMA link is terminated using the BYE message once the second session is active and handling data payloads of the VoIP media stream.

Figure 18:
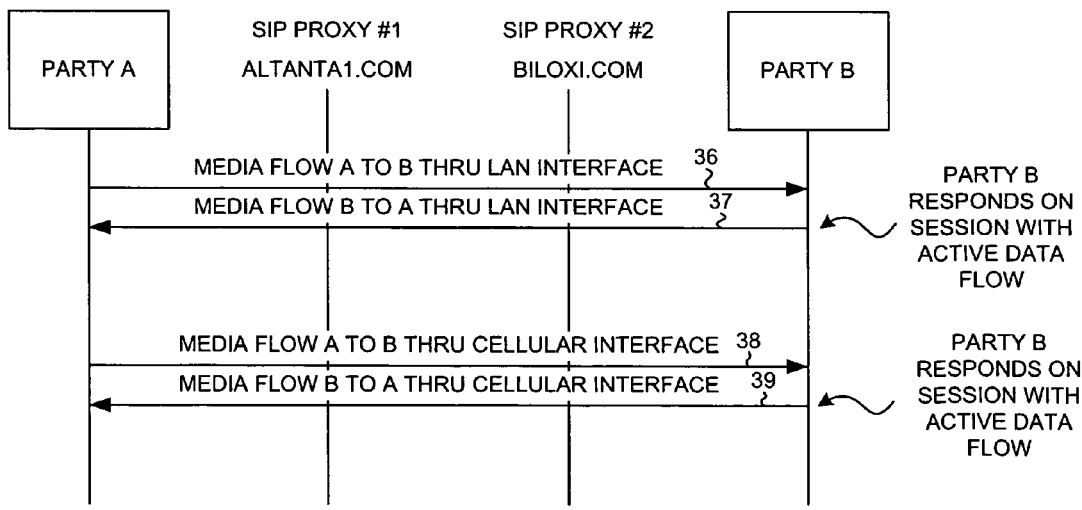
FIG. 18 illustrates an alternative way for IP phone 9 to determine that VoIP data payload packets for the media stream are no longer being communicated in the first session but rather are now to be communicated in the second session.

FIG. 18 illustrates an alternative data flow handoff mechanism. Rather than sending a control handoff control packet to signal the switching of data payload VoIP packets from one session to another session, IP phone 2 simply starts communicating data payload VoIP packets in the second session.

Arrow 36 represents initial data payload VoIP packet communicated from PARTY A to PARTY B. When PARTY B receives data payload VoIP packets on the first session, PARTY B responds by sending any data payload VoIP packets it wishes to send to PARTY A in the first session. This flow of data payload VoIP packets from PARTY B to PART A is represented by arrow 37. To switch the flow of data payload VoIP packets from the first session to the second session, PARTY A simply starts sending data payload VoIP packets to PARTY B in the second session. This flow is represented by arrow 38. When PARTY B starts receiving data payload VoIP packets on the second session, PARTY B responds by sending any subsequent data payload VoIP packets it wishes to send to PARTY A in the second session. This flow of data payload VoIP packets from PARTY B to PART A on the second session is represented by arrow 39.

Although a system is described above wherein PARTY B has an IP phone to which VoIP data payload packets are sent across a TCP connection that terminates in the IP phone, PARTY B may not have an IP phone but rather may engage in IP telephony via a media gateway. If the call is an incoming call to PARTY B, then the media gateway receives the VoIP call, makes a second conventional call to PARTY B, and relays payload information between the VoIP call and the second conventional call. If the call is an outgoing call from PARTY B, then PARTY B makes a conventional call to the media gateway, the media gateway makes a second VoIP call to the intended callee, and the media gateway relays payload information between the conventional call and the VoIP call. The media gateway therefore acts as a dummy IP phone for PARTY B.

Although IP phone 9 in the example described above is a landline IP phone, IP phone 9 is a mobile wireless communication device (for example, a cellular telephone) in another example. The first and second sessions can be initiated by either mobile or landline IP phones.

Figure 19:
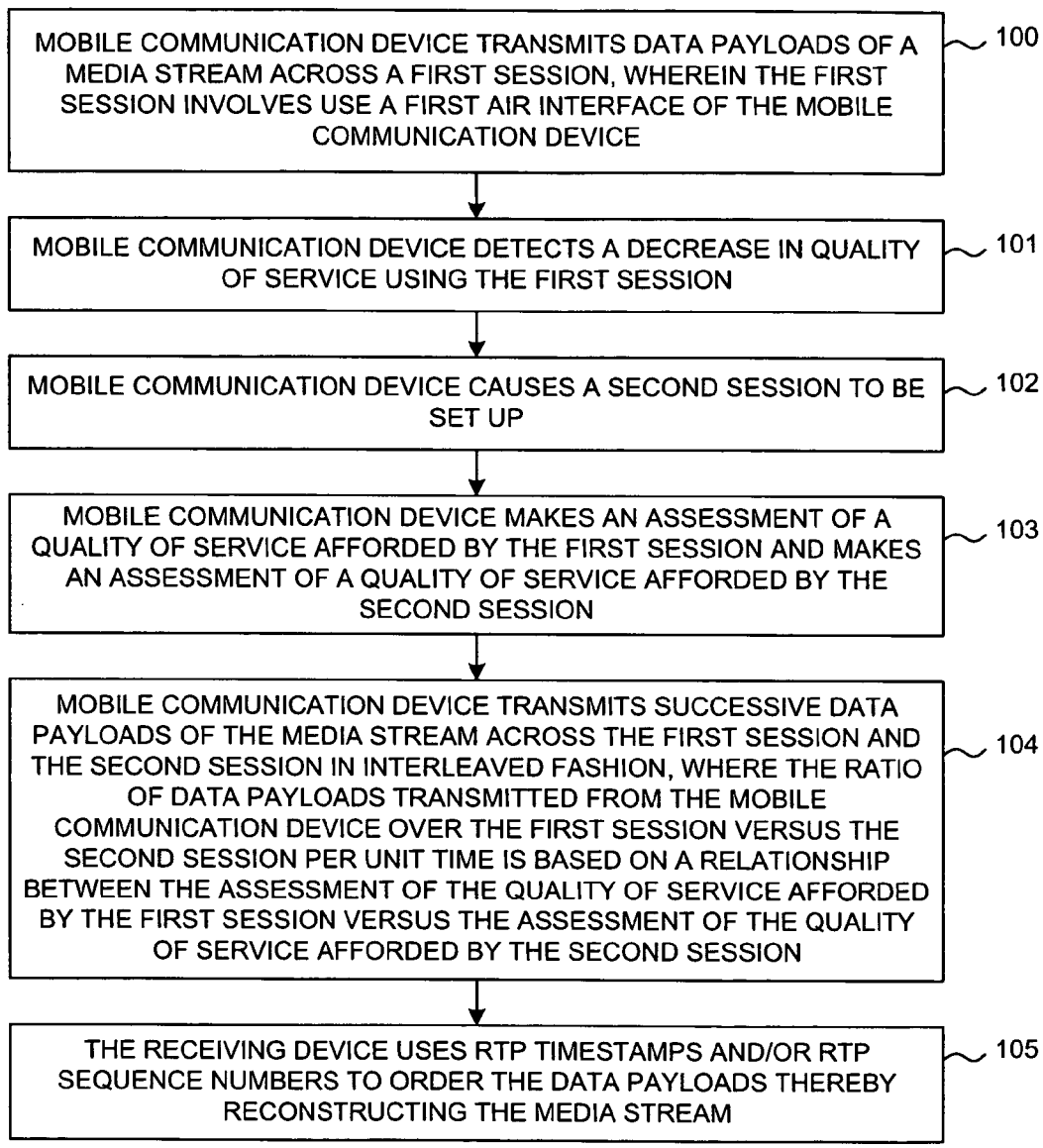
FIG. 19 is a diagram of a method in accordance with a second novel aspect.

FIG. 19 is a diagram of a method in accordance with a second novel aspect. A mobile communication device has a first air interface and a second air interface. The first air interface is usable for communicating VoIP/VIP packets over a first wireless communication link between the mobile communication device and a transceiver on a first network. The second air interface is usable for communicating VoIP/VIP packets over a second wireless communication link between the mobile communication device and a transceiver on a second network. In one example, the mobile communication device is a cellular telephone that is capable of operating as an IP phone. A representative system in which the method of FIG. 19 can be carried out is the system illustrated in FIG. 1. The cellular telephone is IP phone 2. The first air interface of IP phone 2 is an 802.11 interface and the first wireless communication link is a cellular telephone link between IP phone 2 and local area network (LAN) 4. The second air interface of IP phone 2 is a cellular telephone interface and the second wireless communication link is a cellular telephone link between IP phone 2 and cellular telephone network 5.

In step 100 in the method illustrated in FIG. 19, PARTY A uses the mobile communication device (for example, IP phone 2) to communicate in a first session with PARTY B. In the example being described, PARTY B is using IP phone 9. The first session (for example, an RTP session set up by SIP, sometimes called a "SIP RTP session", an "SIP session", or a "VoIP session"), is set up in one example as explained above in connection with FIGS. 1-5. The mobile communication device transmits data payloads of a media stream in the first session using the first air interface.

Next (step 101), PARTY A moves IP phone 2 away from the wireless access point 3 on first network 4 as explained above in connection with FIG. 6. As a consequence of the movement, a quality of service afforded by the wireless communication link between IP phone 2 and the wireless access point 3 is degraded. This decrease in quality of service may, for example, involve one or more of the following: a decrease in the data payload bit rate (bits per second) that can be communicated from IP phone 2 to IP phone 9 in the first session, a decrease in the data payload bit rate (bits per second) that can be communicated from IP phone 9 to IP phone 2 in the first session, a decrease in the total number of RTP packets communicated per unit time from IP phone 2 to IP phone 9 in the first session, a decrease in the total number of RTP packets communicated per unit time from IP phone 9 to IP phone 2 in the first session, an increase in a number of RTP packets lost during a communication in the first session from IP phone 2 to IP phone 9, an increase in a number of RTP packets lost during a communication in the first session from IP phone 9 to IP phone 2, an increase in jitter between the arrival of incoming packets either into IP phone 2 or into IP phone 9, an increase in the time required (sometimes referred to as latency) to communicate packets end-to-end from IP phone 2 to IP phone 9, an increase in the time required to communicate packets end-to-end from IP phone 9 to IP phone 2. The decrease in quality of service may be manifest in reduced RF signal strength as detected by IP phone 2, by access point 3, or both.

IP phone 2 detects (step 101) the decrease in quality of service using one or more manifestation of quality of service. There are many ways that IP phone 2 can detect the decrease in quality of service. In one example, IP phone 2 receives RTCP (Real-Time Control Protocol) receiver report (RR) packets in the first session from IP phone 9. These RTCP receiver reports contain a total number of packets received onto IP phone 9 in the first session. IP phone 2 determines a number of packets received into IP phone 9 in an amount of time by subtracting the total number of packets value in an initial RTCP receiver report from the total number of packets value in a subsequent RTCP receiver report. IP phone 2 determines a time difference between the two RTCP reports, and then divides the determined number of packets received in the amount of time from the time difference, thereby obtaining an approximate number of packets received into IP phone 9 per unit time. This value in one embodiment is used as an assessment of quality of service.

IP phone 2 performs this operation to detect a decrease in quality of service periodically on a regular basis to track the number of packets received onto IP phone 9 in the first session per unit time. When the number of packets received onto IP phone 9 per unit time drops below a threshold level, then IP phone 2 causes a second VoIP session (step 102) to be set up for communication between IP phone 2 and IP phone 9. The second session involves communication between IP phone 2 and an access point 3 on cellular telephone network 5 using the second air interface of IP phone 2.

An alternative way of detecting a decrease in quality of service involves the use of the lost fraction (fraction of the packets lost) fields, the lost count fields, and/or the inter-arrival jitter fields of consecutive RTCP receiver reports. From the values in these fields, the total number of packets lost and the inter-arrival jitter is monitored over time. If the number of packets lost per unit time increases beyond a threshold level, or if the inter-arrival jitter increases beyond a threshold level, then a determination is made the quality of service has decreased.

The second session can be set up using any suitable method. In the example presently described, the second session is set up using the method described above in connection with FIGS. 7-11. IP phone 2 communicates a SIP SPAWN message that identifies the first session to IP phone 9. IP phone 9 responds by communicating a SIP OK message back to IP phone 2. The SIP OK message includes a SPAWN identifier. IP phone 2 then communicates a SIP INVITE message to IP phone 9, where the SIP INVITE message includes the spawn identifier. IP phone 9 receives the SIP INVITE message, sets up a second session, and uses the SIP INVITE message to associate the second session with the first session.

Rather than terminating the first session once the second session is active, both the first session and the second session are used at the same time in concert to communicate VoIP/VIP packets of the single media stream between IP phone 2 and IP phone 9 in accordance with the method of the second novel aspect. The single media stream may, for example, be voice data representing the voice of PARTY A. The voice data media stream is carried in the data payloads of the VoIP/VIP packets. For example, four segments of voice data of the media stream may be communicated from IP phone 2 to IP phone 9 as follows: first voice data is communicated in a first VoIP/VIP packet across the first session, then second voice data subsequent to the first voice data is communicated in a second VoIP/VIP packet across the second session, then third voice data subsequent to the second voice data is communicated in a third VoIP/VIP packet across the first session, and then fourth voice data subsequent to the third voice data is communicated in a fourth VoIP/VIP packet across the second session. Voice data is therefore communicated in interleaved fashion across the two sessions. In accordance with the RTP protocol, each VoIP/VIP packet has an RTP timestamp as well as an RTP sequence number. IP phone 9 receives the VoIP/VIP packets coming into the IP phone 9 across the first and second sessions, and uses the RTP timestamps and/or RTP sequence numbers to order the data payloads so as to reconstruct the media stream. In the example described above wherein the four VoIP/VIP packets carry voice data of a single media stream, the data payloads are ordered by IP phone 9 in the following order: first data payload, second data payload, third data payload, fourth data payload. IP phone 9 uses the RTCP sequence numbers and RTCP time stamps to properly order the data payloads. The properly ordered data payloads constitute the reconstructed media stream.

In one embodiment, the same number of data payloads of the media stream are always communicated on the first session and the second session per unit time. Alternatively, the ratio of data payloads communicated in the first session versus the second session per unit time is varied. The ratio of data payloads is determined by a relationship between an assessment of a quality of service of the first session versus an assessment of a quality of service of the second session. Various different indicators of quality of service can be used as measures of quality of service of a session. For example, IP phone 2 receives RTCP receiver report packets from IP phone 9 for the first session.

IP phone 2 uses the total number of packets received information in the RTCP receiver reports to make an assessment (step 104) of a quality of service of the first session and to make an assessment of a quality of service of the second session. If, for example, the number of packets received per unit time onto IP phone 9 in the first session drops with respect to the number of packets received per unit time onto IP phone 9 in the second session, then it may that the first wireless communication link between IP phone 2 and LAN access point 3 is to blame. Accordingly, IP phone 2 communicates successive data payloads of the media stream across the first session and the second session in interleaved fashion (step 105), where the ratio of VoIP/IP packets transmitted from IP phone 2 over the first session to the second session is set to be the ratio of the assessed quality of service available using the first session to the accessed quality of service available using the second session. As the relative quality of service available on one session versus the other session changes, so too does IP phone 2 change the ratio of VoIP/VIP packets transmitted over the first session versus the second session. Where the quality of service available using either the first session or the second session is not adequate to communicate the desired media stream information from IP phone 2 to IP phone 9, the combined communication capabilities of the first and second sessions may be adequate and may be used to share the communication load to achieve a quality of service characteristic not available using either session by itself.

Figure 20:
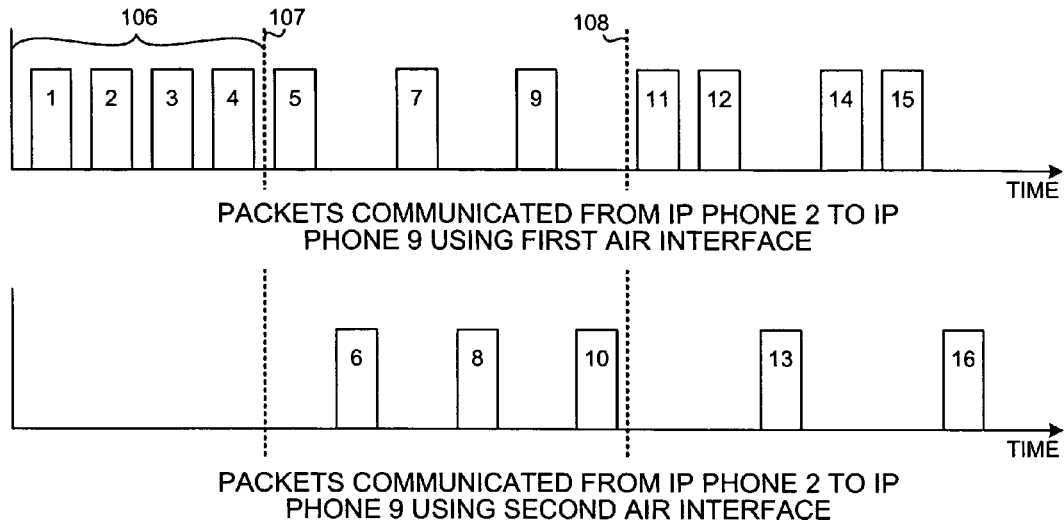
FIG. 20 is a simplified diagram that illustrates VoIP/VIP packets being communicated from a mobile communication device to a second IP device in accordance with the second novel aspect.

FIG. 20 is a simplified diagram that illustrates VoIP/VIP packets being communicated from IP phone 2 to IP phone 9 in accordance with the second novel aspect. In the diagram, the upper time line represents communications from IP phone 2 to IP phone 9 using the first session. The lower time line represents communications from IP phone 2 to IP phone 9 using the second session. Time extends from left to right. The diagram is not to scale in the horizontal dimension but rather is presented to indicate relative timings of various VoIP/VIP packets with respect to one another.

Initially in time period 106, a succession of VoIP/VIP packets denoted 1-4 are communicated using the first session. Then, at time 107, a decrease in quality of service is detected in the first session and the second session is set up. Thereafter, six VoIP/VIP packets denoted 5-10 are communicated in interleaved fashion from IP phone 2 using both the first and second sessions. The number of VoIP/VIP packets communicated per unit time in the two sessions is identical because the assessment of quality of service afforded by the first session is substantially the same as the assessment of quality of service afforded by the second session. In the illustrated example, this condition persists until time 108 when the relative assessments of quality of service between the first and second sessions changes. The quality of service afforded by the first session is determined to be twice as good as the quality of service afforded by the second session. Accordingly, starting at time 108, twice the number of VoIP/VIP packets are communicated per unit time in the first session than in the second session. Six more VoIP/VIP packets denoted 11-16 are shown being communicated after time 108.

In the same way that IP phone 2 periodically adjusts the ratio of VoIP/VIP packets transmitted on the first session versus the second session, so too can IP phone 9 periodically adjust the ratio of VoIP/VIP packets transmitted to IP phone 2 on the first session versus the second session. IP phone 9 may, for example, receive RTCP receiver reports from IP phone 2 for the first session and may also receive RTCP receiver reports from IP phone 2 for the second session. IP phone 9 can use the information in these receiver reports to make an assessment of a quality of service afforded by the first session and a quality of service afforded by the second session. IP phone 9 then adjusts the ratio of VoIP/VIP packets communicated to IP phone 2 on the first session versus the second session so that the ratio is the same as the ratio of an assessment of a quality of service provided by one session versus an assessment of a quality of service provided by the other session.

Figure 21:
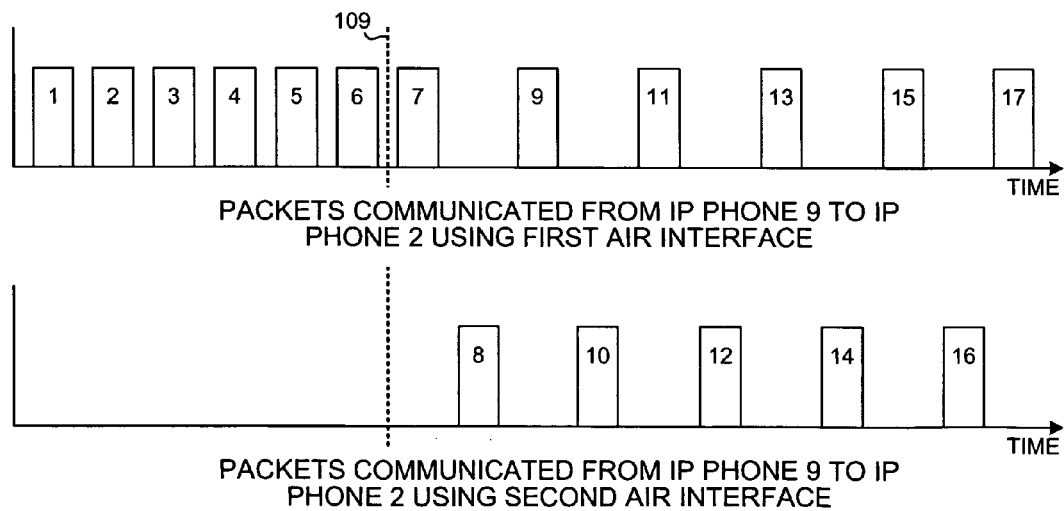
FIG. 21 is a simplified diagram that illustrates VoIP/VIP packets being communicated from the second IP device to the mobile communication device in accordance with the second novel aspect.

FIG. 21 is a simplified diagram that illustrates VoIP/VIP packets being communicated from IP phone 9 to IP phone 2 in accordance with the second novel aspect. In the diagram, the first six VoIP/VIP packets are communicated in the first session before time 109. IP phone 9 makes an assessment of the quality of service afforded by the first session and makes an assessment of the quality of service afforded by the second session. In the illustrated example, the two sessions are determined to afford the same quality of service. Accordingly, after time 109, IP phone 9 transmits half of the VoIP/VIP packets in the first session and half in the second session. The times when the relative ratio of VoIP/VIP packets communicated change in FIG. 20 are different from the times when the relative ratio of VoIP/VIP packets communicated change in FIG. 21. This is to illustrate the point that the relative ratios of the sessions used in the two directions of communications need not be the same.

Accordingly it is seen that both air interfaces of IP phone 2 are used to communicate RTP data payloads of an incoming media stream and to communicate RTP data payloads of an outgoing media stream. Use of one of the two air interfaces may be stopped if communication across it is completely lost. Use of one of the two air interfaces may also be stopped if communication across the other air interface is sufficiently good to warrant only using just that one air interface. The decision of how many air interfaces to use and in what proportion may be a simple or involved function of a number of variables. The variables include indicators of quality of service and cost information.

There may be many reasons that the total number of packets received across a session per unit time may change. It is recognized that the first wireless communication link is but one part of the overall communication path from IP phone 2 to IP phone 9. As such, a decrease in the total number of packets received in a session may not be attributable or may not be entirely attributable to a decrease in the ability of the first wireless communication link to communicate data. Accordingly, assessments of the quality of service other than the one set forth above involving a total number of packets received per unit time may be employed. In one example, RTCP receiver report packets are not employed. Rather, wireless access point 3 maintains quality of service information about performance of the first wireless link (for example, instantaneous bit rate information and/or an indication of RF signal strength detected in the access point). This quality of service information is communicated from wireless access point 3 to IP phone 2 using a MAC layer communication or other communication below the RTP and SIP layers. IP phone 2 receives similar quality of service information about the second wireless communication link from cellular access point 30. The quality of service information about the two wireless communication links is then used to make the assessments of the relative quality of services afforded by the two sessions.

Although certain specific embodiments are described above for instructional purposes, the present invention is not limited thereto. The event that gives rise to the setting up of the second session in the second novel aspect need not be a decrease of quality of service in the first session in all cases. In one example, there is no detected substantial decrease in the quality of service afforded by the first session, but rather the amount of data of the media stream to be communicated per unit time increases to where the first session is no longer adequate to communicate the data of the media stream in a desired manner (for example, with a desired maximum latency). In response, the second session is set up to communicate the excess data of the data of the media stream. Once the excess data has been communicated and the amount of data to be communicated per unit time declines to its original level, then the second session is no longer needed and is used sparingly or is terminated. The second novel aspect is therefore usable to communicate slugs of data that would otherwise overburden the first session and cause undesirable latency in the communication across the first session. Examples of such slugs of data include still image information and video information communicated during the course of a telephone conversation. Although an example of the second novel aspect is described above in connection with a mobile communication device that communicates packets in interleaved fashion over two air interfaces, a mobile communication device can communicate packets in interleaved fashion in accordance with the second novel aspect over three or more air interfaces. Accordingly, various modifications, adaptations, and combinations of the various features of the described specific embodiments can be practiced without departing from the scope of the invention as set forth in the claims.

What is claimed is:

1. A method of transmitting a first data payload, a second data payload, a third data payload, and a fourth data payload, wherein the first data payload includes data of a media stream, wherein the second data payload includes data subsequent to the first data payload in the media stream, wherein the third data payload includes data subsequent to the second data payload in the media stream, and wherein the fourth data payload includes data subsequent to the third data payload in the media stream, the method comprising:

transmitting, from a first device to a second device via a first wireless communication link between the first device and a first network, a first VoIP/VIP (voice over Internet Protocol or video over Internet Protocol) packet in a first application layer session between a first IP address associated with the first device and a second IP address associated with the second device, the first VoIP/VIP packet including the first data payload;

transmitting a SPAWN SIP (Session Initialization Protocol) message in the first application layer session from the first device to the second device via the first wireless communication link, wherein the SPAWN SIP message identifies the first application layer session;

receiving at the first device a first SIP OK message from the second device via the first wireless communication link, the first SIP OK message including a SPAWN identifier that comprises a hash of a FROM field, a TO field, a CALL-ID field, and a CSEQ number of the first application layer session;

transmitting a SIP INVITE message from the first device to the second device via a second wireless communication link, wherein the SIP INVITE message includes the SPAWN identifier;

receiving a second SIP OK message from the second device;

transmitting, from the first device to the second device via the second wireless communication link between the first device and a second network, a second VoIP/VIP packet in a second application layer session between a third IP address associated with the first device and the second IP address, wherein the first application layer session and the second application layer session are active simultaneously, the second VoIP/VIP packet including the second data payload;

transmitting a third VoIP/VIP packet in the first application layer session via the first wireless communication link, the third VoIP/VIP packet including the third data payload; and transmitting a fourth VoIP/VIP packet in the second application layer session via the second wireless communication link, the fourth VoIP/VIP packet including the fourth data payload.

2. The method of claim 1, wherein the first and third VoIP/VIP packets are transmitted over the first wireless communication link in accordance with a wireless LAN (local area network) communication protocol, wherein the second and fourth VoIP/VIP packets are transmitted over the second wireless communication link in accordance with a cellular telephone communication protocol, and wherein the first device is at least one of: an IP phone, a cellular telephone, a PDA (Personal Digital Assistant), or a computer having a wireless communication capability.

3. The method of claim 1, wherein the first, second, third and fourth VoIP/VIP packets are RTP (Real-Time Transport Protocol) packets each of which includes an RTP timestamp.

4. The method of claim 1, wherein the first, second, third and fourth VoIP/VIP packets are RTP (Real-Time Transport Protocol) packets each of which includes an RTP sequence number.

5. The method of claim 1, further comprising:
receiving a Real-Time Control Protocol (RTCP) receiver report by the first device, the RTCP receiver report comprising an assessment of a quality of service of the first application layer session.

6. The method of claim 5, wherein the assessment of the quality of service of the first application layer session comprises a signal strength of the first wireless communication link.

7. The method of claim 1, wherein the data of the first data payload, the data of the second data payload, the data of the third data payload, and the data of the fourth data payload include at least one of: voice data, still image data, or video data.

8. The method of claim 1, further comprising:
reconstructing at least a portion of the media stream in the second device by ordering the first, second, third and fourth data payloads in the order: first data payload, second data payload, third data payload, fourth data payload.

9. The method of claim 8, wherein the reconstructing step involves using RTP timestamps to perform said ordering.

10. The method of claim 8, wherein the reconstructing step involves using RTP sequence numbers to perform said ordering.

11. A method of transmitting a plurality of data payloads of a media stream, the method comprising:
setting up a first VoIP/VIP (Voice over Internet Protocol or Video over Internet Protocol) communication path between a mobile communication device and a second device;
setting up a second VoIP/VIP communication path between the mobile communication device and the second device;
transmitting a SPAWN SIP (Session Initialization Protocol) message from the mobile communication device to the second device via the first VoIP/VIP communication path, wherein the SPAWN SIP message identifies a first application layer session corresponding to the first VoIP/VIP communication path;
receiving at the mobile communication path device a first SIP OK message from the second device via the first VoIP/VIP communication path, the first SIP OK message including a SPAWN identifier that comprises a hash of a FROM field, a TO field, a CALL-ID field, and a CSEQ number of the first application layer session;
transmitting a SIP INVITE message from the mobile communication device to the second device via the second VoIP/VIP communication path, wherein the SIP INVITE message includes the SPAWN identifier;
receiving a second SIP OK message from the second device;
transmitting a first subset of the data payloads from the mobile communication device to the second device across the first VoIP/VIP communication path;
transmitting a second subset of the data payloads from the mobile communication device to the second device across the second VoIP/VIP communication path; and
adjusting a ratio of a first plurality of data payloads transmitted across the first VoIP/VIP communication path from the mobile communication device to the second device in the first application layer session between the mobile communication device and the second device versus a second plurality of data payloads transmitted across the second VoIP/VIP communication path from the mobile communication device to the second device in a second application layer session between the mobile communication device and the second device, wherein the ratio is based on a ratio of a first assessment of a quality of service of the first application layer session versus a second assessment of a quality of service of the second application layer session.

12. The method of claim 11, wherein the mobile communication device is a cellular telephone, the mobile communication device includes an 802.11 interface, and the first VoIP/VIP communication path includes a wireless communication link between the 802.11 interface and a local area network (LAN).

13. The method of claim 11, wherein the ratio is not a calculated value and is a result of said adjusting.

14. The method of claim 11, further comprising:
receiving the first and second subsets of data payloads by the second device and ordering the data payloads of the first and second subsets to reconstruct the media stream.

15. The method of claim 11, wherein the first VoIP/VIP communication path includes a first wireless communication link between a first air interface on the mobile communication device and an access point on a first network.

16. The method of claim 11, wherein the second VoIP/VIP communication path includes a second wireless communication link between a second air interface on the mobile communication device and an access point on a second network.

17. The method of claim 16, wherein the second network is a cellular telephone network and the second air interface is a cellular telephone interface.

18. A mobile communication device comprising:
a first air interface;
a second air interface; and
a processor that executes a stack of protocol processing layers, wherein the processor is configured to:
transmit first VoIP/VIP (Voice over Internet Protocol or Video over Internet Protocol) data payloads via the first air interface to a second device in a first application layer session between the mobile communication device and the second device;
transmit a SPAWN SIP (Session Initialization Protocol) message to the second device via the first application layer session, wherein the SPAWN SIP message identifies the first application layer session;
receive a first SIP OK message from the second device via the first air interface, the first SIP OK message including a SPAWN identifier comprising a hash of a FROM field, a TO field, a CALL-ID field, and a CSEQ number of the first application layer session;

transmit a SIP INVITE message via the second air interface to the second device in a second application layer session between the mobile communication device and the second device, wherein the SIP INVITE message includes the SPAWN identifier;

receive a second SIP OK message;

transmit second VoIP/VIP data payloads, via the second air interface to the second device in the second application layer session between the mobile communication device and the second device;

adjust a ratio of a number of first VoIP/VIP data payloads transmitted via the first air interface per unit time to a number of second VoIP/VIP data payloads transmitted via the second air interface per the unit time during the transmission of the first VoIP/VIP data payloads and the second VoIP/VIP data payloads, wherein the first VoIP/VIP data payloads and the second VoIP/VIP data payloads are payloads of a single media stream, wherein the ratio is based on a ratio of a first assessment of a quality of service of the first application layer session versus a second assessment of a quality of service of the second application layer session.

19. The mobile communication device of claim 18, wherein the processor executes a set of processor-executable instructions to:

determine the first assessment of a quality of service of the first application layer session; and determine the second assessment of a quality of service of the second application layer session.

20. The mobile communication device of claim 18, wherein:

the first assessment of the quality of service of the first application layer session comprises first signal strength information from a first access point, wherein the first access point is involved in transmitting the first VoIP/VIP data payloads; and the second assessment of the quality of service of the second application layer session comprises second signal strength information from a second access point, wherein the second access point is involved in transmitting the second VoIP/VIP data payloads.

21. The mobile communication device of claim 18, wherein:

the first assessment of the quality of service of the first application layer session comprises first data rate information from a first access point, wherein the first access point is involved in transmitting the first VoIP/VIP data payloads; and the second assessment of the quality of service of the second application layer session comprises second data rate information from a second access point, wherein the second access point is involved in communicating transmitting the second VoIP/VIP data payloads.

22. The mobile communication device of claim 18, wherein the mobile communication device is a cellular telephone, wherein the first application layer session is set up using SIP, and wherein the second application layer session is set up using SIP.

23. The mobile communication device of claim 18, wherein the ratio is not a calculated value and is a result of adjustment.

24. A mobile communication device comprising:

a first air interface;

a second air interface;

means for transmitting a SPAWN SIP (Session Initialization Protocol) message to a second device via a first application layer session, wherein the SPAWN SIP message identifies the first application layer session;

means for receiving a first SIP OK message from the second device via the first air interface, the first SIP OK message including a SPAWN identifier comprising a hash of a FROM field, a TO field, a CALL-ID field, and a CSEQ number of the first application layer session;

means for transmitting a SIP INVITE message, via the second air interface, to the second device in a second application layer session between the mobile communication device and the second device, wherein the SIP INVITE message includes the SPAWN identifier;

means for receiving a second SIP OK message from the second device; and means for adjusting a ratio of first VoIP (Voice over Internet Protocol) packets transmitted to the second device via the first air interface versus second VoIP packets transmitted to the second device via the second air interface, wherein the first VoIP packets are transmitted via the first air interface in the first application layer session between the mobile communication device and the second device, and wherein the second VoIP packets are transmitted via the second air interface in the second application layer session between the mobile communication device and the second device, the first application layer session and the second application layer session being active simultaneously, and wherein the first VoIP packets and the second VoIP packets contain voice data for a single voice data media stream.

25. The mobile communication device of claim 24, wherein the means for adjusting is a processor that executes a set of processor-executable instructions.

\* \* \* \* \*